United States Patent
Celeskey et al.

(10) Patent No.: US 8,495,629 B2
(45) Date of Patent: Jul. 23, 2013

(54) VIRTUAL MACHINE RELOCATION SYSTEM AND ASSOCIATED METHODS

(75) Inventors: Emily K. Celeskey, Johnson City, NY (US); Timothy D. Greer, Endicott, NY (US); Cathy C. Hupman, Endicott, NY (US); Selina Lok, East Hanover, NJ (US)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 12/565,830

(22) Filed: Sep. 24, 2009

(65) Prior Publication Data

US 2011/0072429 A1 Mar. 24, 2011

(51) Int. Cl.
G06F 9/455 (2006.01)
G06F 9/46 (2006.01)

(52) U.S. Cl.
USPC ............. 718/1; 718/102; 718/104; 718/105

(58) Field of Classification Search
None
See application file for complete search history.

(56) References Cited

U.S. PATENT DOCUMENTS

| | | | |
|---|---|---|---|
| 8,095,929 B1 * | 1/2012 | Ji et al. | 718/1 |
| 8,175,863 B1 * | 5/2012 | Ostermeyer et al. | 703/22 |
| 8,364,908 B2 * | 1/2013 | Barsness et al. | 711/148 |
| 2006/0085785 A1 * | 4/2006 | Garrett | 718/1 |
| 2007/0169121 A1 * | 7/2007 | Hunt et al. | 718/1 |
| 2007/0271560 A1 * | 11/2007 | Wahlert et al. | 718/1 |
| 2008/0163207 A1 | 7/2008 | Reumann et al. | |
| 2008/0177424 A1 | 7/2008 | Wheeler | |
| 2008/0184229 A1 * | 7/2008 | Rosu et al. | |
| 2008/0276235 A1 * | 11/2008 | Knauerhase et al. | 718/1 |
| 2009/0113420 A1 * | 4/2009 | Pawlowski | 718/1 |
| 2009/0276774 A1 * | 11/2009 | Kinoshita | 718/1 |
| 2009/0327781 A1 * | 12/2009 | Tripathi | 713/324 |
| 2010/0191845 A1 * | 7/2010 | Ginzton | 709/224 |
| 2010/0242045 A1 * | 9/2010 | Swamy et al. | 718/104 |
| 2010/0333089 A1 * | 12/2010 | Talwar et al. | 718/1 |

OTHER PUBLICATIONS

Ivan Krsul et al., "VMPlants: Providing and Managing Virtual Machine Execution Environments for Grid Computing", IEEE 0-7695-2153-3/04, pp. 1-12 (2004).

Ripal Nathuji et al., "VirtualPower: Coordinated Power Management in Virtualized Enterprise Systems", SOSP'07, Oct. 14-17, 2007, Stevenson, Washington, USA, ACM 978-1-59593-591-5/07/0010, pp. 265-278 (2007).

Piyush Shivam et al., "Automated and On-Demand Provisioning of Virtual Machines for Database Applications", SIGMOD'07, Jun. 12-14, 2007, Beijing, China, ACM 978-1-59593-686-8/07/0006, pp. 1079-1081.

* cited by examiner

*Primary Examiner* — Emerson Puente
*Assistant Examiner* — Adam Lee
(74) *Attorney, Agent, or Firm* — Dennis Jung; Ido Tuchman

(57) ABSTRACT

A system to address virtual machine relocation may include a computer system and a host operating system executing on the computer system. The system may also include a second computer system and a second host operating system executing on the second computer system. The system may further include a virtual machine executing on the host operating system. The system may additionally include a tool to relocate the virtual machine to the second host operating system based upon the host operating system's needs, the second host operating system's availability, and/or the virtual machine's relocation eligibility.

15 Claims, 7 Drawing Sheets

VIRTUAL MACHINE RELOCATION SYSTEM AND ASSOCIATED METHODS

BACKGROUND OF THE INVENTION

1. Field of the Invention

The invention relates to the field of computer systems, and, more particularly, to the relocation of virtual machines in such.

2. Description of Background

In general, a virtual machine is a software application that executes programs like a real computer system. For example, a virtual machine is a logical sharing or partition of CPU, memory, or the like that appears to programs executing in the virtual machine to be a real computer with dedicated CPU, memory, and the like.

SUMMARY OF THE INVENTION

According to one embodiment of the invention, a system to address virtual machine relocation may include a computer system and a host operating system executing on the computer system. The system may also include a second computer system and a second host operating system executing on the second computer system. The system may further include a virtual machine executing on the host operating system. The system may additionally include a tool to relocate the virtual machine to the second host operating system based upon the host operating system's needs, the second host operating system's availability, and/or the virtual machine's relocation eligibility.

The tool may control timing of the relocation between the host operating system and the second host operating system. The tool may control the relocation timing based upon configuration parameters, user input information, statistical data, historical averages, and/or historical trends of the virtual machine's operation.

The tool may determine a success level of the virtual machine's relocation. The tool may match a below average success level to the virtual machine's configuration profile. The tool may generate a possible code errors report based upon any mismatches. The host operating system's needs may comprise planned system outages.

Another aspect of the invention is a method to address virtual machine relocation. The method may include executing a host operating system on a computer system and a second host operating system on a second computer system. The method may also include executing a virtual machine on the host operating system. The method may further include using a tool to relocate the virtual machine to the second host operating system based upon the host operating system's needs, the second host operating system's availability, and/or the virtual machine's relocation eligibility.

The method may also include controlling relocation timing between the host operating system and the second host operating system. The method may further include controlling the relocation timing based upon configuration parameters, user input information, statistical data, historical averages, and/or historical trends of the virtual machine's operation.

The method may also include determining a success level of the virtual machine's relocation. The method may further include matching a below average success level to the virtual machine's configuration profile. The method may additionally include generating a possible code errors report based upon any mismatches.

Another aspect of the invention is a computer program product that may address virtual machine relocation. The computer program product may include a computer readable storage medium having computer readable program code embodied therewith. The computer readable program code may include computer readable program code configured to execute a host operating system on a computer system and a second host operating system on a second computer system. The computer readable program code may also include computer readable program code configured to execute a virtual machine on the host operating system. The computer readable program code may further include computer readable program code configured to use a tool to relocate the virtual machine to the second host operating system based upon at least one of the host operating system's needs, the second host operating system's availability, and the virtual machine's relocation eligibility.

Another aspect of the invention is a system that may include a plurality of computer systems and a plurality of host operating systems executing on the plurality of computer systems. The system may also include a plurality of virtual machines each executing via a respective one of the plurality of host operating systems. The system may further include a tool to relocate any of the plurality of virtual machines to a different one of the plurality of host operating systems based upon the respective needs of the plurality of host operating systems, availability of a different one of the plurality of host operating systems, and/or the relocation eligibility of each of the plurality of virtual machines.

The tool may determine each of the plurality of virtual machines' configurations. The tool may determine which of the plurality of virtual machines is expected to pass or fail the relocation. The tool may review each of the plurality of virtual machines' configurations for potential relocation errors.

The tool may order at least one of when and where each of said plurality of virtual machines is relocated. The tool uses the order to address at least one of the plurality of host operating systems' respective needs and the different one of the plurality of host operating systems availability.

DETAILED DESCRIPTION OF THE INVENTION

Figure 1:
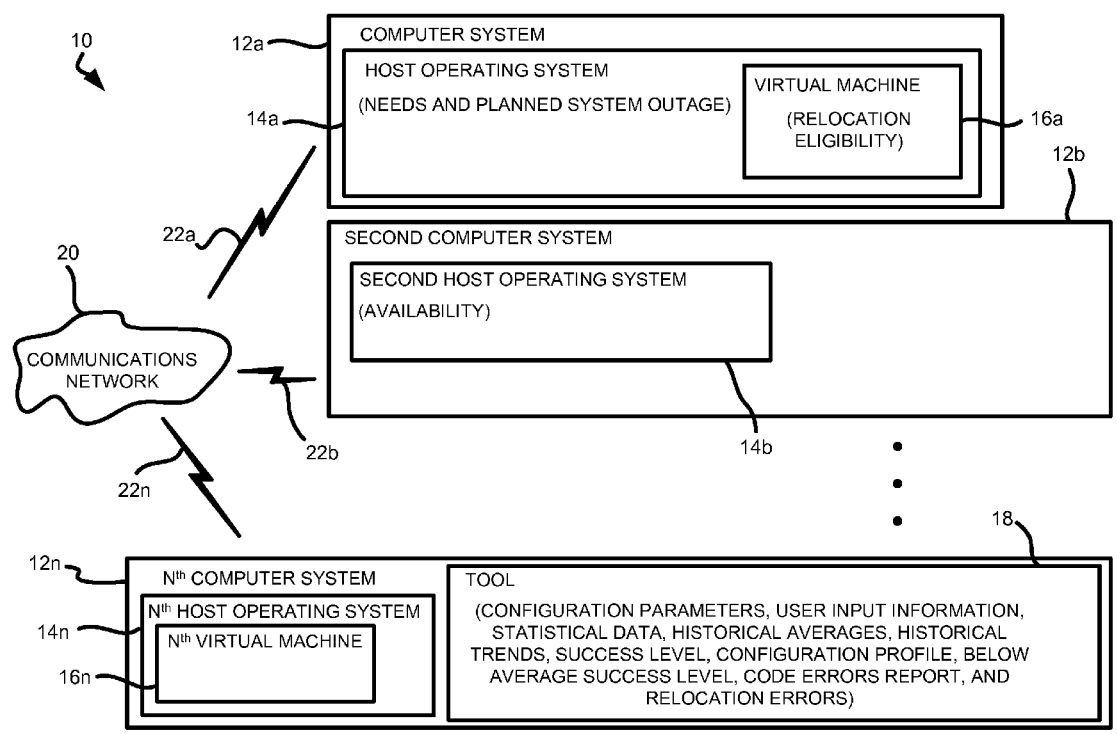
FIG. 1 is a schematic block diagram of a system to relocate virtual machines in accordance with the invention.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

With reference now to FIG. 1, a system 10 to address virtual machine relocation is initially described. The system 10 is a programmable apparatus that stores and manipulates data according to an instruction set as will be appreciated by those of skill in the art.

According to one embodiment of the invention, the system 10 includes a computer system 12a and a host operating system 14a executing on the computer system. In another embodiment, the system 10 includes a second computer system 12b and a second host operating system 14b executing on the second computer system. In one embodiment, the system 10 includes a virtual machine 16a executing on the host operating system. In another embodiment, the system 10 includes a tool 18 to relocate the virtual machine 16a to the second host operating system 14b based upon the host operating system's 14a needs, the second host operating system's availability, and/or the virtual machine's relocation eligibility.

In one embodiment, the tool 18 controls timing of the relocation between the host operating system 14a and the second host operating system 14b. In another embodiment, the tool 18 controls the relocation timing and which users are relocated based upon scenarios determined by configuration parameters, user input information, statistical data, historical averages, and/or historical trends of the virtual machine's operation.

In one embodiment, the tool 18 determines a success level of the virtual machine's 16a relocation. In another embodiment, the tool 18 matches a below average success level to the virtual machine's 16a configuration profile. In one embodiment, the tool 18 generates a possible code errors report based upon any mismatches. In another embodiment, the host operating system's 14a needs may comprise planned system outages.

In one embodiment, the system 10 includes a communications network 20, which enables a signal to travel anywhere within system 10 and/or to any other system connected to system 10. The communications network 20 is wired and/or wireless, for example. The communications network 20 is local and/or global with respect to system 10, for instance. The communications network 20 includes communications links 22a-22n as will be appreciated by those of skill in the art.

Figure 2:
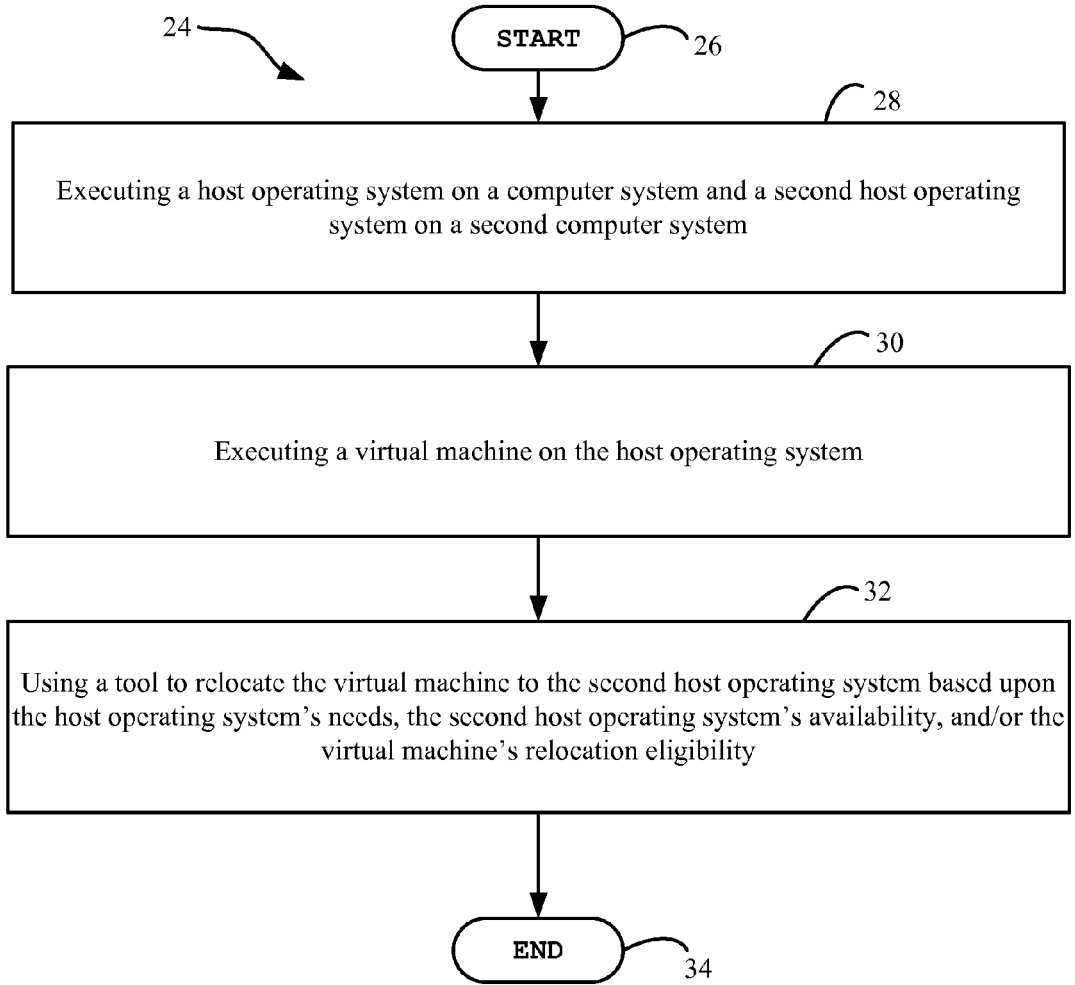
FIG. 2 is a flowchart illustrating method aspects according to the invention.

Another aspect of the invention is a method to address virtual machine relocation, which is now described with reference to flowchart 24 of FIG. 2. The method begins at Block 26 and may include executing a host operating system on a computer system and a second host operating system on a second computer system at Block 28. The method may also include executing a virtual machine on the host operating system at Block 30. The method may further include using a tool to relocate the virtual machine to the second host operating system based upon the host operating system's needs, the second host operating system's availability, and/or the virtual machine's relocation eligibility at Block 32. The method ends at Block 34.

Figure 3:
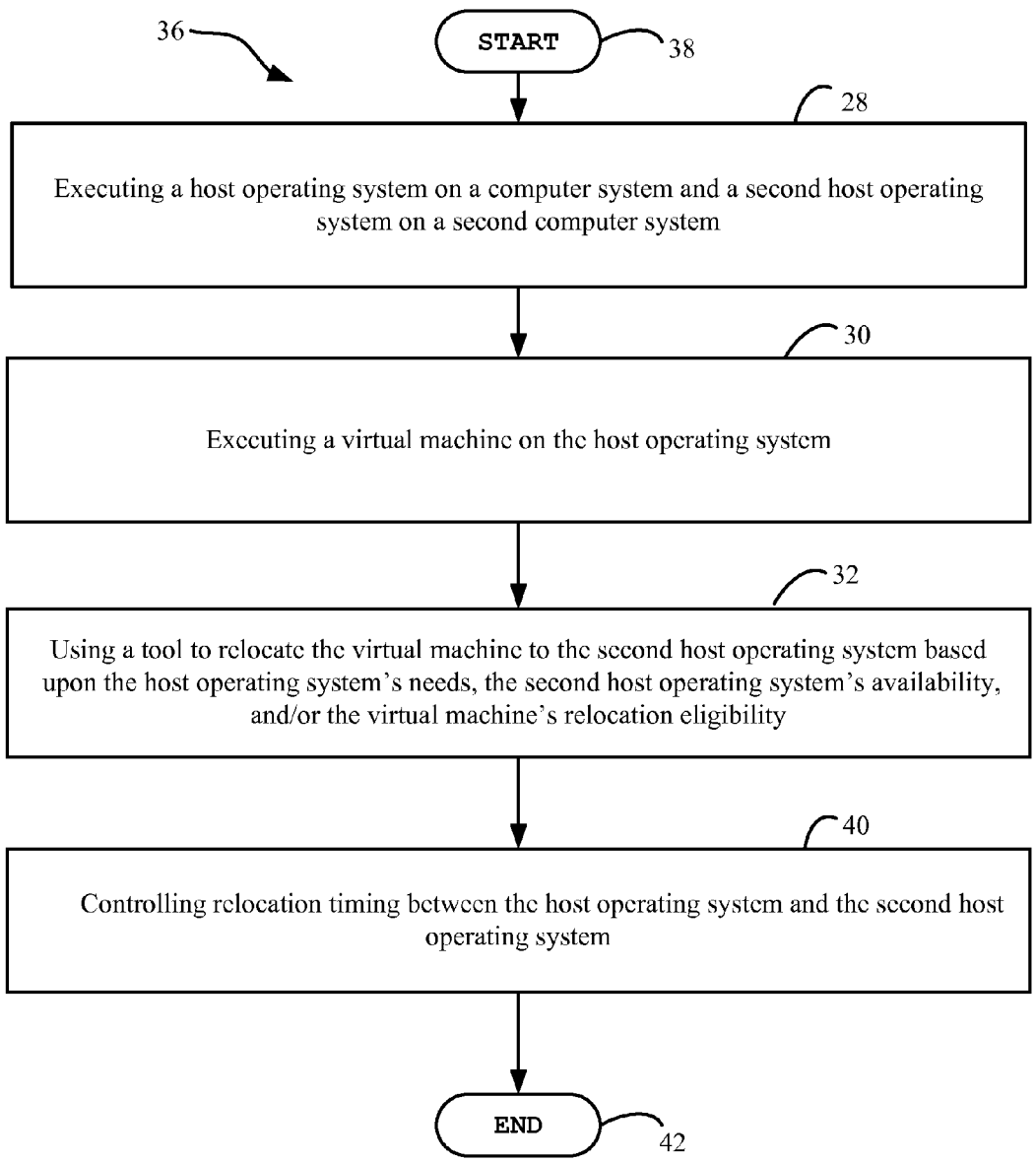
FIG. 3 is a flowchart illustrating method aspects according to the method of FIG. 2.

In another method embodiment, which is now described with reference to flowchart 36 of FIG. 3, the method begins at Block 38. The method may include the steps of FIG. 2 at Blocks 28, 30, and 32. The method may additionally include controlling relocation timing between the host operating system and the second host operating system at Block 40. The method ends at Block 42.

Figure 4:
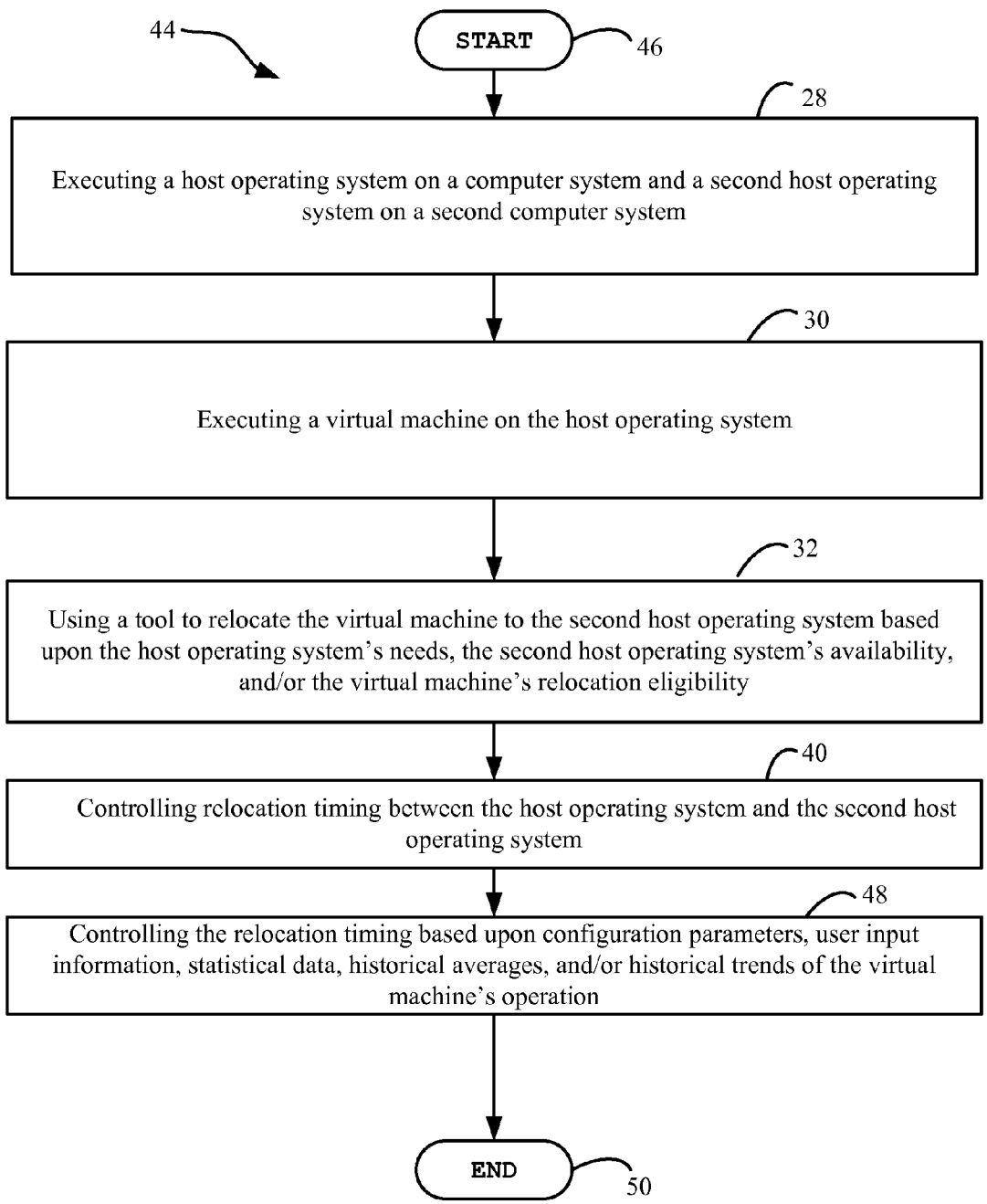
FIG. 4 is a flowchart illustrating method aspects according to the method of FIG. 3.

In another method embodiment, which is now described with reference to flowchart 44 of FIG. 4, the method begins at Block 46. The method may include the steps of FIG. 3 at Blocks 28, 30, 32, and 40. The method may additionally include controlling the relocation timing based upon configuration parameters, user input information, statistical data, historical averages, and/or historical trends of the virtual machine's operation at Block 48. The method ends at Block 50.

Figure 5:
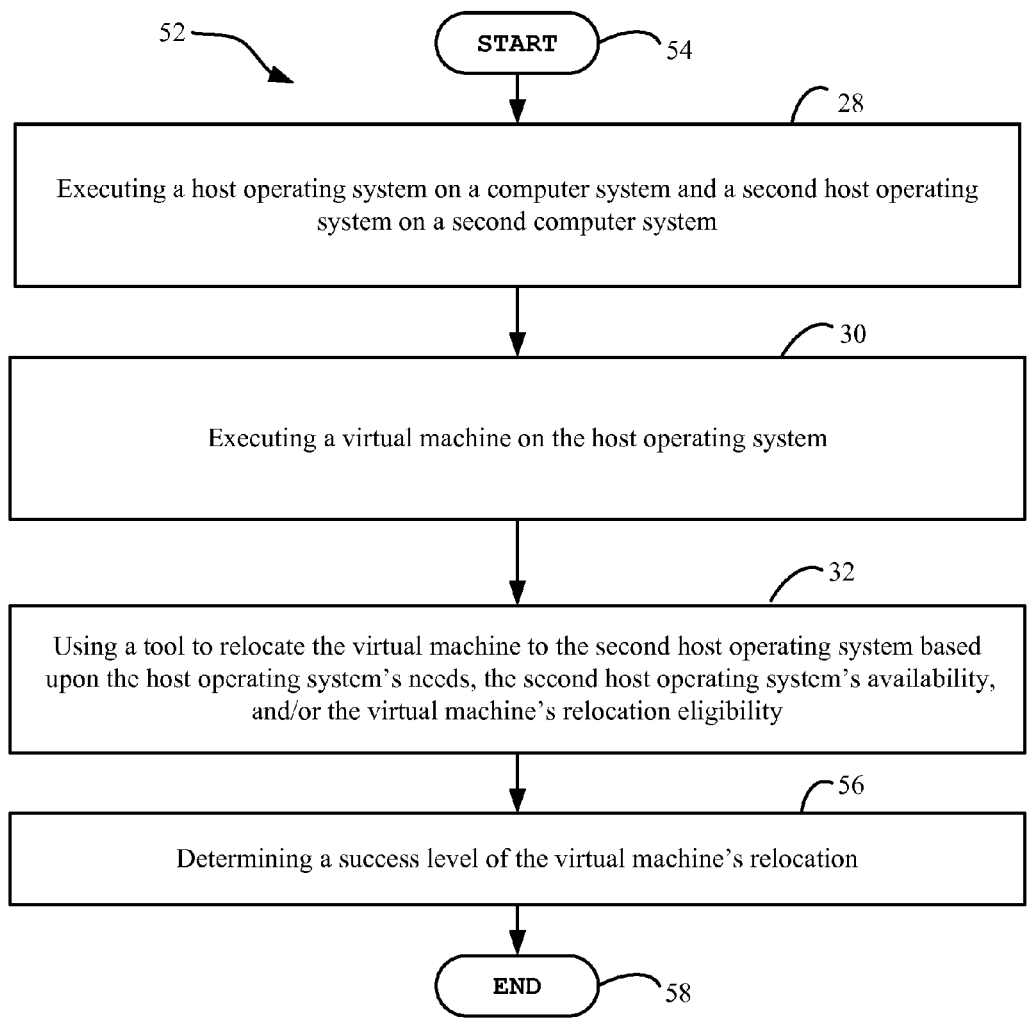
FIG. 5 is a flowchart illustrating method aspects according to the method of FIG. 2.

In another method embodiment, which is now described with reference to flowchart 52 of FIG. 5, the method begins at Block 54. The method may include the steps of FIG. 2 at Blocks 28, 30, and 32. The method may additionally include determining a success level of the virtual machine's relocation at Block 56. The method ends at Block 58.

Figure 6:
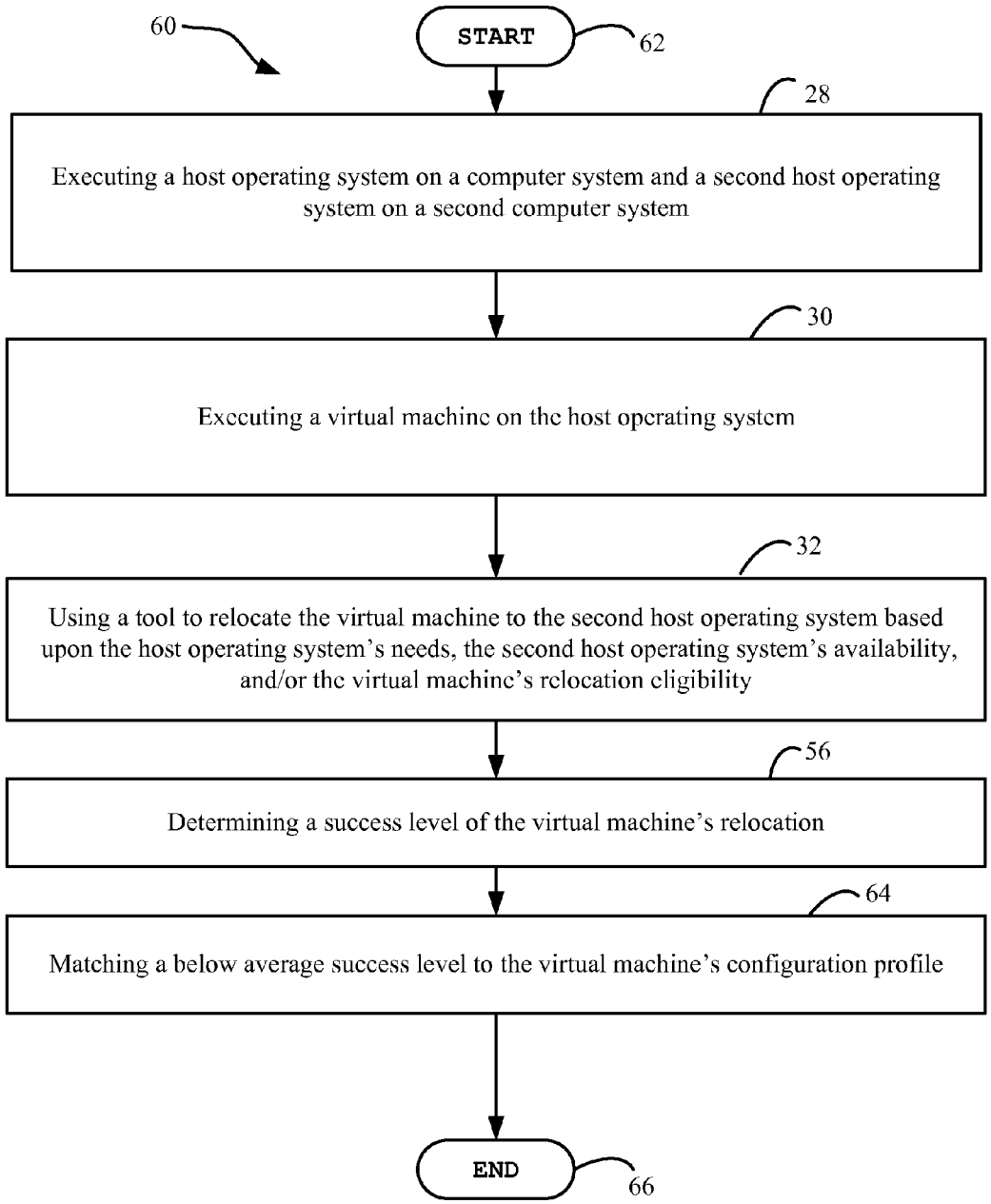
FIG. 6 is a flowchart illustrating method aspects according to the method of FIG. 5.

In another method embodiment, which is now described with reference to flowchart 60 of FIG. 6, the method begins at Block 62. The method may include the steps of FIG. 5 at Blocks 28, 30, 32, and 56. The method may additionally include matching a below average success level to the virtual machine's configuration profile at Block 64. The method ends at Block 66.

Figure 7:
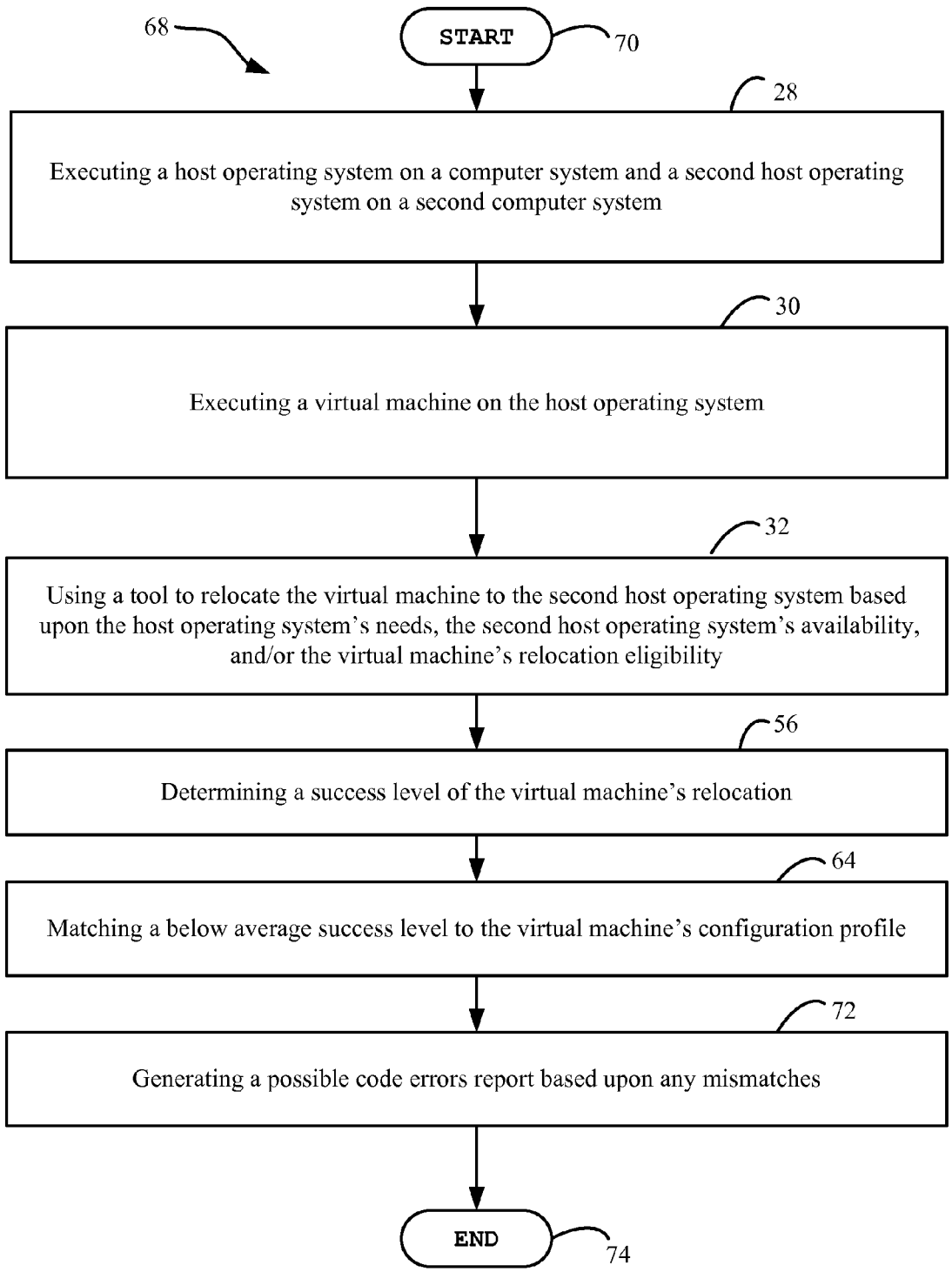
FIG. 7 is a flowchart illustrating method aspects according to the method of FIG. 6.

In another method embodiment, which is now described with reference to flowchart 68 of FIG. 7, the method begins at Block 70. The method may include the steps of FIG. 6 at Blocks 28, 30, 32, 56, and 64. The method may additionally include generating a possible code errors report based upon any mismatches at Block 72. The method ends at Block 74.

Another aspect of the invention is a set of computer readable program codes coupled to tangible media that may address virtual machine relocation. In one embodiment, the computer readable program codes are configured to cause the program to execute a host operating system 14a on a computer system 12a and a second host operating system 14b on a second computer system 12b. In another embodiment, the computer readable program codes execute a virtual machine 16a on the host operating system. In one embodiment, the computer readable program codes use a tool 18 to relocate the virtual machine 16a to the second host operating system 14b based upon the host operating system's 14a needs, the second host operating system's availability, and/or the virtual machine's relocation eligibility.

Referring back to FIG. 1, another aspect of the invention is a system 10 that includes a plurality of computer systems 12a-12n and a plurality of host operating systems 14a-14n executing on the plurality of computer systems. In one embodiment, the system 10 includes a plurality of virtual machines 16a-16n each executing via a respective one of the plurality of host operating systems 14a-14n. In another embodiment, the system 10 includes a tool 18 to relocate any of the plurality of virtual machines 16a-16n to a different one of the plurality of host operating systems 14a-14n based upon the plurality of host operating systems' respective needs, the different one of the plurality of host operating systems availability, and/or each of the plurality of virtual machines' relocation eligibility.

In one embodiment, the tool 18 determines each of the plurality of virtual machines' 16a-16n configurations. In another embodiment, the tool 18 determines which of the plurality of virtual machines 16a-16n is expected to pass or fail the relocation. In one embodiment, the tool 18 reviews each of the plurality of virtual machines' 16a-16n configurations for potential relocation errors.

In one embodiment, the tool 18 orders when and/or where each of said plurality of virtual machines 16a-16n is relocated. In another embodiment, the tool 18 uses the order to address the plurality of host operating systems' 14a-14n respective needs and/or the different one of the plurality of host operating systems availability.

In view of the foregoing, the system 10 addresses virtual machine relocation, for example. In one embodiment, the tool 18 takes in the user directory to determine which users may be running on the system 10 and their possible problems. From there it looks for active users (inactive users may not be relocatable) and queries their active configurations to determine any additional restrictions. In another embodiment, then from the active users, the tool 18 determines which guests to move where based on a testing profile (e.g., maximizing data throughput) and kicks off the relocations.

In one embodiment, the tool 18 then determines if relocations were successful and if the guests continued to run. In another embodiment, if the relocations were not successful, the tool 18 tries to match the problems encountered with the guests' configurations. Any mismatches are highlighted as possible code errors, for instance.

In one embodiment, the system 10 involves the automated test generation and checking of Live Guest Relocation ("LGR") eligibility errors. In another embodiment, a new LGR code on IBM's z/VM system runs on only a small subset of all possible guests, therefore there are a number of things a relocating guest is not allowed to do.

In one embodiment, each of these eligibility restrictions generates its own error, and to do this eligibility checking by hand would be time/cost prohibitive and highly error prone. Similarly, kicking off the relocations and verifying that the errors received match what the guest is doing would be very difficult to do manually for an entire z/VM system, for example.

In one embodiment, the input comes in the form of a user directory, containing initial user information; various query input, a list of possible error messages and the way to tell if a guest should encounter these errors. In another embodiment, the tool 18 checks the user directory to see which users have static configurations that will cause errors.

In one embodiment, the tool 18 creates a master file with all the users and whether they are expected to pass or fail. For each user expected to fail, the tool 18 creates a restrictions file containing the expected error messages, for example.

In one embodiment, the tool 18 then queries which users are active on the system 10. In another embodiment, for each active user, the tool 18 goes through all the possible queries to see if the user's active configuration will cause an error.

In one embodiment, for each active configuration error expected, the tool 18 updates/creates the user's restriction file and updates the master file, if necessary. Then for all the active users, the tool 18 issues the relocation command, for instance.

In one embodiment, to determine the order of users to be relocated, the system 10 looks at the system and guest configurations. For instance, the guest's memory usage and number of links between the system could give system 10 an estimate of how quickly the guest would relocate. Based on this information the tool 18 will then have various "relocation use cases".

In one embodiment, one use case could be to keep the links as busy as possible, while another could focus on relocating small and large guests alternately. In another embodiment, each use case should stress the code and system in different ways.

In one embodiment, the tool 18 then checks the command output against the master file and restrictions file and highlights any differences (by creating a differences file). If the command was successful (the relocation could take awhile), the tool 18 then checks the test case running on the user to ensure it continued running while the command was being executed, for example. Of course the tool 18 cannot assume that the guest has been running a test case (for instance the guest could be a service machine for the system), so instead the tool 18 will keep a historical comparison to help tell if the guest has relocated successfully, for instance.

In one embodiment, each user will have a profile of sorts with average time to relocate and guest "behavior" (again, memory usage, commands it usually issues, average time for relocation). For example, the most recent statistics should be in line with the usual.

In one embodiment, if the relocation failed but was expected to pass, several steps are taken. First, the active configuration queries are re-run to see if the guest has changed its configuration since we last looked. If the difference still exists (i.e., the current configuration doesn't seem to match the problems the tool 18 saw) the tool 18 further classifies the difference.

For instance, there are two basic types of differences: more problems than expected, or fewer problems than expected. In the case of more problems than expected, the tool can see if the additional problems were caused by temporary active configuration changes (for example a guest "rebooting"), in which case it could still pass the relocation, although flagging it as "yellow". If there were fewer problems received than expected, or the mismatches were not related to temporary changes, then the tool would fail the relocation because it likely signals a code error (or at least a documentation problem in the relocation restrictions), for example. The tool can also check the guest's console to see if it issued any commands that caused these changes and also look historically at which problems the guest has.

For instance, if the tool sees the guest reboot several times a week, we may stop counting this problem against this guest. This would mean that some mismatches would not fail the test case. In the rare case where a user logs off before its configuration has been checked and there is a mismatch, the errors can be flagged as "orange", for example.

In one embodiment, the tool 18 compiles a list of all the relocations it has issued and whether the expected output was received. In another embodiment, this is formatted in a human readable way, e.g. HTML file.

In one embodiment, this output should also be compared to the historical data. In another embodiment, average time of all relocations and average system performance should be in line with previous instances of the use case. For example, if the tool is running the "keep all links busy" use case and it can usually relocate 30 large users, the current statistics should be in line with that.

In one embodiment, the tool 18 concerns itself with the effects of its actions upon the underlying host systems 14a-14n. In other words, the tool 18 selects guests to relocate based on the expected effect on the host systems 14a-14n.

In one embodiment, the system 10 manipulates the timing of relocation requests to affect the host systems 14a-14n and/or the connections between them. In another embodiment, the tool collects statistical data and uses historical averages or trends to predict the host systems' 14a-14n responses to patterns of relocation requests. For example, these responses do affect guests being relocated—as the amount of time required to relocate—so there is some applicability to the problem of maximizing guest performance (or avoiding dropping below some minimum). But even here, the focus is on the host systems 14a-14n rather than the guests.

In one embodiment, the system 10 is about handling the relocations themselves to drive various functions in the hypervisor layer. In another embodiment, the system 10 assumes that relocations have to happen because of planned system outages. (That sentence doesn't seem to make sense there.)

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:
1. A system comprising:
a computer system including a computer processor and computer readable memory;
a host operating system executing on said computer system;
a second computer system;
a second host operating system executing on said second computer system;
a virtual machine executing on said host operating system; and
a tool to relocate said virtual machine to said second host operating system based upon said host operating system's needs; and
wherein said tool:
controls timing of the relocation between said host operating system and said second host operating system based upon historical trends of said virtual machine's operation;
determines said virtual machine's configuration;

determines whether or not the relocation of said virtual machine was successful; and if the relocation was unsuccessful then said tool matches any problems encountered with the unsuccessful relocation with the virtual machine's configuration to generate a possible code errors report based on any mismatches.

2. The system of claim 1 wherein said tool determines a success level of said virtual machine's relocation.

3. The system of claim 2 wherein said tool matches a below average success level to said virtual machine's configuration profile.

4. The system of claim 1 wherein said host operating system's needs comprise planned system outages.

5. A method comprising:

executing a host operating system on a computer system and a second host operating system on a second computer system;

executing a virtual machine on the host operating system;

using a tool to relocate the virtual machine to the second host operating system based upon the host operating system's needs;

controlling timing of the relocation between the host operating system and the second host operating system based upon historical trends of the virtual machine's operation;

determining the virtual machine's configuration;

determining whether or not the relocation of the virtual machine was successful; and if the relocation was unsuccessful then matching any problems encountered with the unsuccessful relocation with the virtual machine's configuration to generate a possible code errors report based on any mismatches.

6. The method of claim 5 further comprising determining a success level of the virtual machine's relocation.

7. The method of claim 6 further comprising matching a below average success level to the virtual machine's configuration profile.

8. A non-transitory computer program product to address virtual machine relocation, the computer program product comprising:

a computer readable storage medium having computer readable program code embodied therewith, the computer readable program code comprising:

computer readable program code configured to execute a host operating system on a computer system and a second host operating system on a second computer system;

computer readable program code configured to execute a virtual machine on the host operating system;

computer readable program code configured to use a tool to relocate the virtual machine to the second host operating system based upon the host operating system's needs;

computer readable program code configured to control timing of the relocation between the host operating system and the second host operating system based upon historical trends of the virtual machine's operation;

computer readable program code configured to determine the virtual machine's configuration;

computer readable program code configured to determine whether or not the relocation of the virtual machine was successful; and if the relocation was unsuccessful then matching any problems encountered with the unsuccessful relocation with the virtual machine's configuration to generate a possible code errors report based on any mismatches.

9. The computer program product of claim 8 further comprising: computer readable program code configured to determine a success level of the virtual machine's relocation.

10. The computer program product of claim 9 further comprising: computer readable program code configured to match a below average success level to the virtual machine's configuration profile.

11. A system comprising:

a plurality of computer systems including a computer processor and computer readable memory;

a plurality of host operating systems executing on said plurality of computer systems;

a plurality of virtual machines each executing via a respective one of said plurality of host operating systems; and a tool to relocate any of said plurality of virtual machines to a different one of said plurality of host operating systems based upon the respective needs of at least one of said plurality of host operating systems, availability of a different one of said plurality of host operating systems, and the relocation eligibility of each of said plurality of virtual machines; and wherein said tool:

controls timing of the relocation between said host operating system and said second host operating system based upon historical trends of said virtual machine's operation;

determines each of said plurality of said virtual machines' configurations;

determines whether or not the relocation of said virtual machine was successful; and if the relocation was unsuccessful then said tool matches any problems encountered with the unsuccessful relocation with the corresponding virtual machine's configuration to generate a possible code errors report based on any mismatches.

12. The system of claim 11 wherein said tool reviews each of said plurality of virtual machines' configurations for potential relocation errors.

13. The system of claim 11 wherein said tool determines which of said plurality of virtual machines is expected to pass or fail the relocation.

14. The system of claim 11 wherein said tool orders at least one of when and where each of said plurality of virtual machines is relocated.

15. The system of claim 14 wherein said tool uses the order to address at least one of the respective needs of said plurality of host operating systems and the availability of said different one of said plurality of host operating systems.

* * * * *